US010719451B2

(12) United States Patent
Moudgill et al.

(10) Patent No.: US 10,719,451 B2
(45) Date of Patent: Jul. 21, 2020

(54) VARIABLE TRANSLATION-LOOKASIDE BUFFER (TLB) INDEXING (71) Applicant: Optimum Semiconductor Technologies, Inc., Tarrytown, NY (US)

(72) Inventors: Mayan Moudgill, Chappaqua, NY (US); A. Joseph Hoane, Yonkers, NY (US); Lei Wang, Beijing (CN); Gary Nacer, Morris Plains, NJ (US); Aaron G. Milbury, New City, NY (US); Enrique A. Barria, Bronxville, NY (US); Paul Hurtley, White Plains, NY (US)

(73) Assignee: OPTIMUM SEMICONDUCTOR TECHNOLOGIES INC., Tarrytown, NY (US)

( * ) Notice: Subject to any disclaimer, the term of this patent is extended or adjusted under 35 U.S.C. 154(b) by 0 days.

(21) Appl. No.: 15/868,513

(22) Filed: Jan. 11, 2018

(65) Prior Publication Data
US 2018/0203806 A1 Jul. 19, 2018

Related U.S. Application Data (60) Provisional application No. 62/446,181, filed on Jan. 13, 2017.

(51) Int. Cl.
*G06F 12/1027* (2016.01)
*G06F 12/1036* (2016.01)
(Continued)

(52) U.S. Cl.
CPC ...... *G06F 12/1027* (2013.01); *G06F 12/1009* (2013.01); *G06F 12/1036* (2013.01);
(Continued)

(58) Field of Classification Search
CPC ............ G06F 12/1027; G06F 12/1009; G06F 12/1036; G06F 12/0864; G06F 2212/1021;
(Continued)

(56) References Cited

U.S. PATENT DOCUMENTS 5,479,627 A * 12/1995 Khalidi et al. .......... G06F 12/10
395/415
5,526,504 A * 6/1996 Hsu et al. ............... G06F 12/10
395/417
(Continued)

OTHER PUBLICATIONS

International Search Report and Written Opinion received in PCT/US18/13484, dated May 15, 2018, pp. 13.

Primary Examiner — Tracy A Warren
(74) Attorney, Agent, or Firm — Zhong Law, LLC (57) ABSTRACT A processor includes a translation lookaside buffer (TLB) comprising a plurality of ways, wherein each way is associated with a respective page size, and a processing core, communicatively coupled to the TLB, to execute an instruction associated with a virtual memory page, identify a first way of the plurality of ways, wherein the first way is associated with a first page size, determine an index value using the virtual memory page and the first page size for the first way, determine, using the index value, a first TLB entry of the first way, and translate, using a memory address translation stored in the first TLB entry, the first virtual memory page to a first physical memory page.

19 Claims, 6 Drawing Sheets (51) Int. Cl.
  *G06F 12/1009* (2016.01)
  *G06F 12/0864* (2016.01)
(52) U.S. Cl.
  CPC .. *G06F 12/0864* (2013.01); *G06F 2212/1021* (2013.01); *G06F 2212/1044* (2013.01); *G06F 2212/652* (2013.01); *G06F 2212/656* (2013.01); *G06F 2212/657* (2013.01); *G06F 2212/68* (2013.01)
(58) Field of Classification Search
  CPC ....... G06F 2212/1044; G06F 2212/652; G06F 2212/657; G06F 2212/68
  See application file for complete search history.

(56) References Cited

U.S. PATENT DOCUMENTS

| | | | | |
|---|---|---|---|---|
| 5,630,087 | A | * | 5/1997 | Talluri et al. ............. G06F 9/26 395/412 |
| 5,712,998 | A | * | 1/1998 | Rosen ..................... G06F 12/08 395/415 |
| 5,765,209 | A | * | 6/1998 | Yetter et al. ............ G06F 12/10 711/207 |
| 5,784,707 | A | * | 7/1998 | Khalidi et al. .......... G06F 12/10 711/206 |
| 5,796,978 | A | * | 8/1998 | Yoshioka ............ G06F 12/1027 711/206 |
| 5,895,501 | A | * | 4/1999 | Smith ..................... G06F 12/10 711/207 |
| 5,907,867 | A | * | 5/1999 | Shinbo et al. .......... G06F 12/10 711/207 |
| 6,370,632 | B1 | * | 4/2002 | Kikuta et al. ............ G06F 12/00 711/205 |
| 6,732,238 | B1 | * | 5/2004 | Evans et al. ............ G06F 12/00 711/128 |
| 6,854,046 | B1 | * | 2/2005 | Evans et al. ............ G06F 12/00 711/203 |
| 9,058,284 | B1 | * | 6/2015 | Ben-Meir et al. ...... G06F 12/10 |
| 2002/0144081 | A1 | * | 10/2002 | Willis et al. ............ G06F 12/00 711/206 |
| 2003/0182532 | A1 | * | 9/2003 | Park et al. .............. G06F 12/00 711/207 |
| 2005/0182903 | A1 | * | 8/2005 | Kinter et al. ........... G06F 12/08 711/133 |
| 2009/0193297 | A1 | * | 7/2009 | Williams et al. ........ G06F 11/28 714/37 |
| 2014/0006747 | A1 | * | 1/2014 | Chen et al. ............. G06F 12/10 711/207 |
| 2015/0095611 | A1 | * | 4/2015 | Popat et al. ........ G06F 12/0292 711/207 |
| 2016/0179700 | A1 | | 6/2016 | Venkatasubramanian et al. |
| 2017/0262381 | A1 | * | 9/2017 | Swaine ................ G06F 12/1027 |
| 2018/0046583 | A1 | * | 2/2018 | Bybell et al. ....... G06F 12/1027 |

\* cited by examiner

FIG. 1

| Validity 202 | Virtual addresses 204 | Physical addresses 206 | Process ID 208 | Permissions 210 | Cache control 212 |

| Validity 202 | Virtual addresses 204 | Physical addresses 206 | Process ID 208 | Wildcard flag 402 | Permissions 210 | Cache control 212 |

VARIABLE TRANSLATION-LOOKASIDE BUFFER (TLB) INDEXING

RELATED APPLICATIONS

The present application claims priority to U.S. Provisional Application No. 62/446,181 filed on Jan. 13, 2017, the content of which is incorporated by reference herein.

TECHNICAL FIELD

The present disclosure relates to processors and, more specifically, to a processor that includes translation lookaside buffers (TLBs) that includes indices supporting variable page sizes.

BACKGROUND

Processors (e.g., central processing units (CPUs)) may execute software applications including system software (e.g., the operating system) and user software applications. A software application being executed on a processor is referred to as a process to the operating system. The operating system may handle multiple processes concurrently or sequentially. A process may include execution of instructions to access hardware storage devices (e.g., the memory and/or device registers). In some implementations, the process may employ virtual addresses to access a location in the storage devices, where the virtual addresses may be associated with a particular process. A memory management unit associated with the processor may translate the process-specific virtual addresses to physical addresses associated with the storage devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

In some implementations, processors may support the execution of multiple processes that can employ a common range of virtual addresses (referred to as the virtual address space). The memory management unit may map the same virtual address employed by different processes to different physical addresses associated with the storage devices (e.g., memory). Conversely, in some implementations, the memory management unit may map different virtual addresses employed by a same process or different processes to a same physical address. The memory management unit associated with the processors may be programmed to implement a logical function (referred to as the virtual memory map) that converts the virtual addresses employed by processes to physical addresses.

The virtual memory map may include a data structure to store attribute values associated with the translation from virtual addresses to physical addresses. Since the information stored in the virtual memory map can be large, processors may employ translation lookaside buffers (TLBs) to cache a portion of the virtual memory map. The cached portion of the virtual memory map can be stored in a cache memory and be retrieved faster than mapping data not stored in the TLB, thus improving the performance of the processors. When a processor uses a virtual address to initiate an access to a location in the memory, the memory management unit associated with the processor may first search the TLB to determine whether the virtual-to-physical address translation is already stored in the TLB. A successful virtual to physical address translation using the TLB is referred to as a TLB hit, and a failed translation using the TLB is referred to as a TLB miss.

When a TLB miss occurs, the memory management unit may need to look up the translation in a page table stored in the memory. The page table lookup is a slower path compared to using the TLB for the address translation. In some implementations, after obtaining the physical address for the virtual address via the page table, processors may store the latest translation from the virtual address to the physical address in the TLB for future address translation requests.

In some implementations, the virtual to physical address translation may be achieved using pages and page tables. Contiguous virtual addresses in a certain range are mapped to contiguous physical addresses. Generally, for efficiency, the range is specified in chunks of 2 s power of bytes. Further, the pages are aligned on the boundary of the range. For example, the pages can be predefined to have 4096 bytes (4 KB), namely each 4 KB of virtual address aligned on a 4 KB boundary being mapped to 4 KB of physical address.

The page table stored in a pre-defined location in the memory contains all the mappings from virtual addresses to physical addresses. Because pages are fixed size, only the address of the first byte in a page needs to be mapped. The virtual to physical address translation using pages is referred to as paging.

In paging, once the virtual to real address translation for the first byte in a page is determined, the mapping for any other address in the page can be obtained by adding an offset to the translation for the first byte. Normally, the first virtual address and the first physical page are always aligned to the page size, allowing the application of a concatenation operation rather than an addition operation in the paging.

Different processes may employ a same range of virtual addresses that may be translated into different physical addresses. Different techniques may be used to map a same virtual address employed by different processes to different physical addresses using the TLB. For example, in some implementations, the TLB only stores entries for the process that is currently executing on the processor. This requires that the TLB be flushed (i.e. all mappings be removed from the cache) when the current process executing on the processor is changed to another process (i.e. on a context switch). In some other implementations, entries of the TLB may store a process identifier that uniquely identifies the process associated with a TLB entry. When the TLB is accessed for virtual to physical address translation, the process identifier may be used to select a range of physical addresses associated with the process. Thus, the process identifier stored in a TLB entry may help determine the mapping for a corresponding process.

Figure 1:
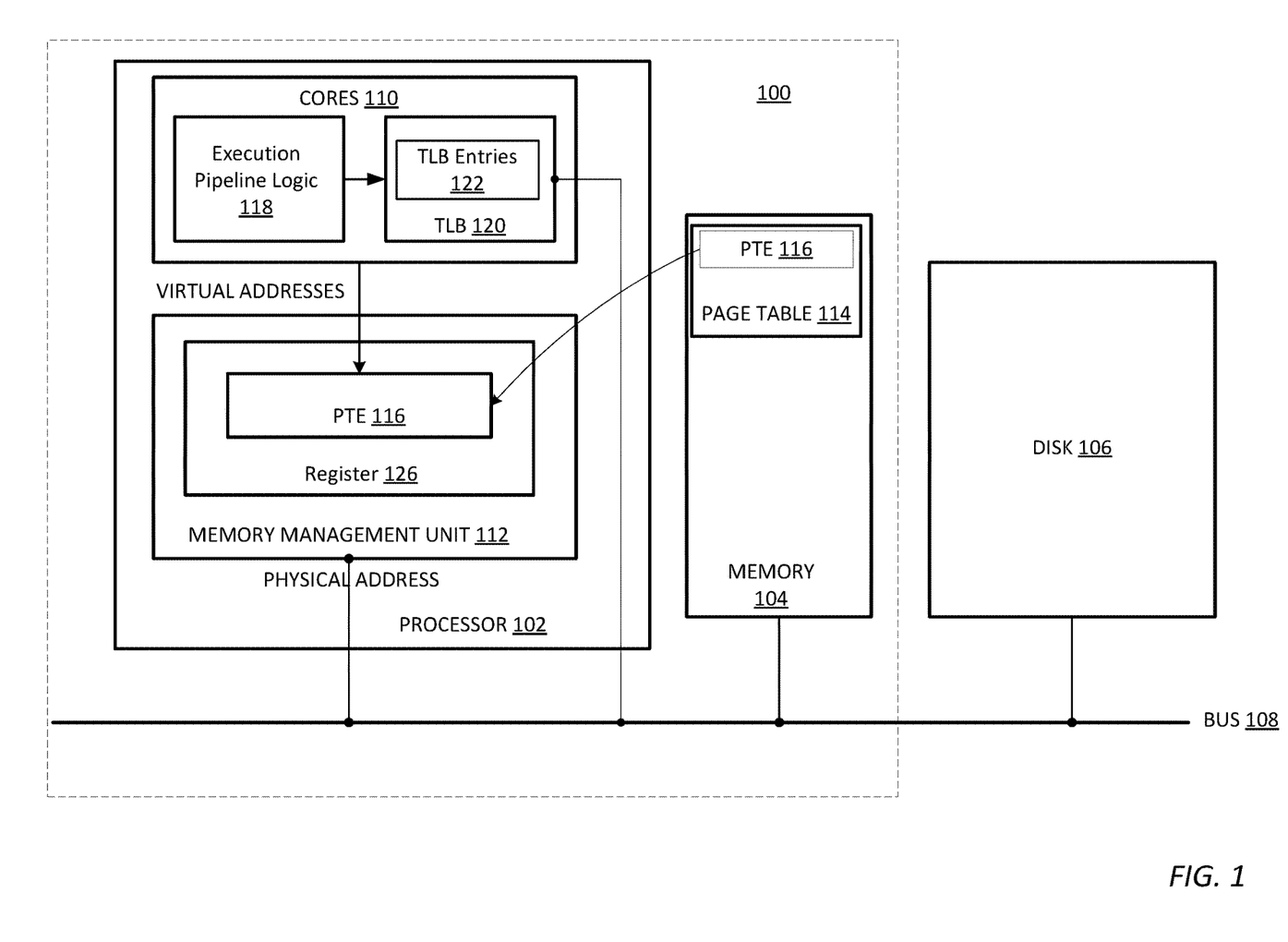
FIG. 1 illustrates a computing system according an embodiment of the present disclosure.

FIG. 1 illustrates a computing system 100 according an embodiment of the present disclosure. The computing system 100 may include a processor (such as a central processing unit (CPU)) 102 and a memory 104 that are connected to each other via a bus system 108. A disk 106 may be coupled to the processor 102 and the memory 104 via the bus 106 to provide swap space in the event that the memory 104 does not have enough space for a task. The memory 104 and disk 106 may store programs (including system applications and user applications) and the data associated with the programs. The processor 102 may execute tasks such as system applications and user applications using the memory 104 to store the instructions of the programs and data associated with the programs.

In one embodiment, the processor 102 may further include one or more processing cores 110 and a memory management unit (MMU) 112. The one or more processing cores may include an execution pipeline logic 118 for executing instructions associated with the tasks. In one embodiment, the tasks executed on processing cores 110 do not access the memory 104 directly using the physical addresses of the memory. Instead, the tasks access a virtual memory through virtual addresses (also known as linear addresses). The memory management unit 112, coupled to the processing cores 110 and the memory, may map the virtual addresses of the virtual memory to the physical addresses of the memory 104. The space of virtual addresses may be divided into fixed sized units called pages. A page of the virtual addresses may be mapped correspondingly into fixed-sized units in the space of the physical addresses of the memory 104 called memory frames.

In one embodiment, the memory 104 may include a page table 114 for storing mappings between pages of virtual addresses to physical addresses. The mappings may include the mapping between identifiers of pages (or page numbers) to identifiers of memory frames (or memory frame numbers). The memory frame numbers determine the region of the memory 104 allocated to a task.

In one embodiment, the page table 114 may include one or more page table entries (PTEs) 116. In one embodiment, a page table entry 116 of the page table 114 may be loaded into a page table register 126 of the memory management unit 112 so that the memory management unit 112 may perform the memory address mapping. Each of the page table entries may store one or more memory frame numbers that are identified according to virtual address page numbers. In one embodiment, a task executing on the processing cores 110 may allocate a block of memory by specifying one or more virtual address ranges. A virtual address may include a first portion including one or more bits (e.g., the high-order twenty bits) indicating the virtual address page number and a second portion of bits (e.g., the lower-order 12 bits) indicating the byte offset within a memory frame corresponding to the page. The memory management unit 112 may use the virtual address page number to identify a memory frame number stored in the page table entry 116, and combine the identified memory frame number and the offset byte to form a physical address for accessing the memory 104.

In one embodiment, processing cores 110 may also include cache 120 for storing a translation lookaside table (TLB). After a virtual to physical address translation is determined via page table 114 (which is the slow path), the address mapping may be stored in a TLB entry 122 as a local copy that can be accessed by the processing core 110. Responsive to subsequent requests to accessing the same virtual address, processing cores 110 may first search TLB 120 for the virtual to physical address translation first. If processing cores 110 are able to find the mapping in TLB 120, processing cores 110 can resolve the address mapping quickly without the need to go through the slow paging process.

In one embodiment, the memory management unit 112 may include logics to check the memory access permission for the task to prevent certain types of memory accesses (e.g., those caused by stray accesses). In one embodiment, each page table entry 116 may include one or more status bits to indicate certain page access statuses that need to be checked before mapping the page numbers in page table entry to memory frame numbers. The TLB entry 122 may correspondingly include information stored in data fields such as those in page table entry 116.

Figure 2:
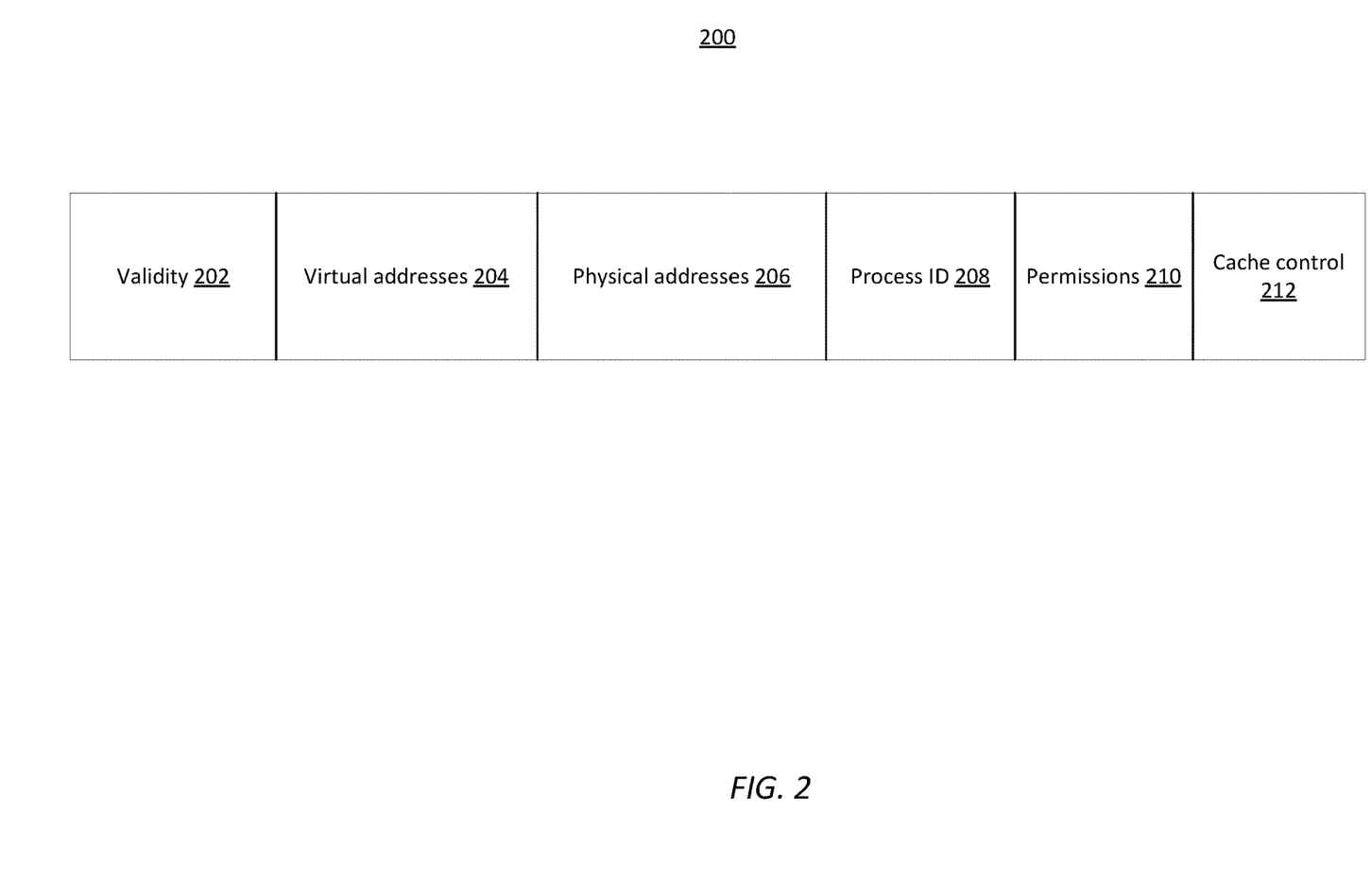
FIG. 2 illustrates a TLB entry according to an embodiment of the present disclosure.

FIG. 2 illustrates a TLB entry 200 according to an embodiment of the present disclosure. As shown in FIG. 2, TLB entry 200 may include a number of fields for storing attribute values. In one embodiment, TLB entry 200 may include a validity field 202, a virtual address field 204, a physical address field 206, a process identifier field 208, a permission field 210, and cache control field 212.

Validity field 202 may store a validity flag indicating whether the TLB entry is valid. For example, the validity flag can be a one-bit flag that indicates a valid TLB entry when the flag value is one, and indicates an invalid TLB entry when the flag value is zero. Virtual address field 204 may store the identifier for the virtual memory page, and physical address field 206 may store the identifier for the physical memory frame corresponding to the virtual memory frame identified by virtual address field 204. TLB entry 200 may optionally include process identifier field 208 for identifying the process associated with the virtual memory address. When there is no process identifier in TLB entry 200, the TLB entry is flushed whenever there is a context switch to another process.

TLB entry 200 may also include other fields for storing useful information. For example, permission field 210 may store a set of permission flags (e.g., read, write, execute) associated with the memory location, and cache control field 212 may store flags associated with caching permissions (e.g., not cachable, write back, write through).

In one embodiment, each of process identifiers is uniquely associated with a respective process that is associated with entries in TLB. Alternatively, TLB entry 200 may include an indirect identifier. Thus, each process may be associated with a set of indirect identifiers. If an indirect identifier stored in a TLB entry belongs to the set of identifiers associated with the process, then the TLB entry is valid for that process. The same indirect identifier can be associated with multiple processes, allowing TLB entries being shared among multiple processes. For example, in an implementation, each page may be associated with one or more identifiers. Each process may also be associated with one or more identifiers. If the identifier associated with a page matches the identifier associated with a process, the process is determined to have access rights (e.g., read, write, execution) to the page.

During a virtual to physical address translation, the processing core may search a TLB entry or a subset of TLB entries for identifying the address translation. There are different approaches to organizing and searching for virtual-to-physical address translation in a TLB.

In some implementations, TLB entries are indexed directly based on virtual addresses, where each TLB entry is searched according to the virtual address. This type of TLB is referred to as a fully associative TLB. In some implementations, the TLB entries may include a process identifier field to store a process identifier value that may associate the TLB entry to a specific process. Table 1 is a segment of pseudo-code for searching a fully associative TLB including process identifiers.

TABLE 1

```
virtual_page := virtual_address(address'HIGH DOWNTO PageSize );
page_offset := address(PageSize-1 DOWNTO 0);
hit := FALSE;
FOR i IN TLB_entries'RANGE:
    IF TLB_entries(i).valid = "1"
            AND TLB_entries(i).virtual = virtual_page
                AND TLB_entires(i).process_id = current_id
    THEN
        real_page = TLB_entries(i).real
        hit := TRUE;
        EXIT;
    END IF;
END FOR;
real_address := real_page & page_offset;
```

In practice, the fully associative TLBs can be too expensive to implement for a large number of TLB entries.

Figure 3:
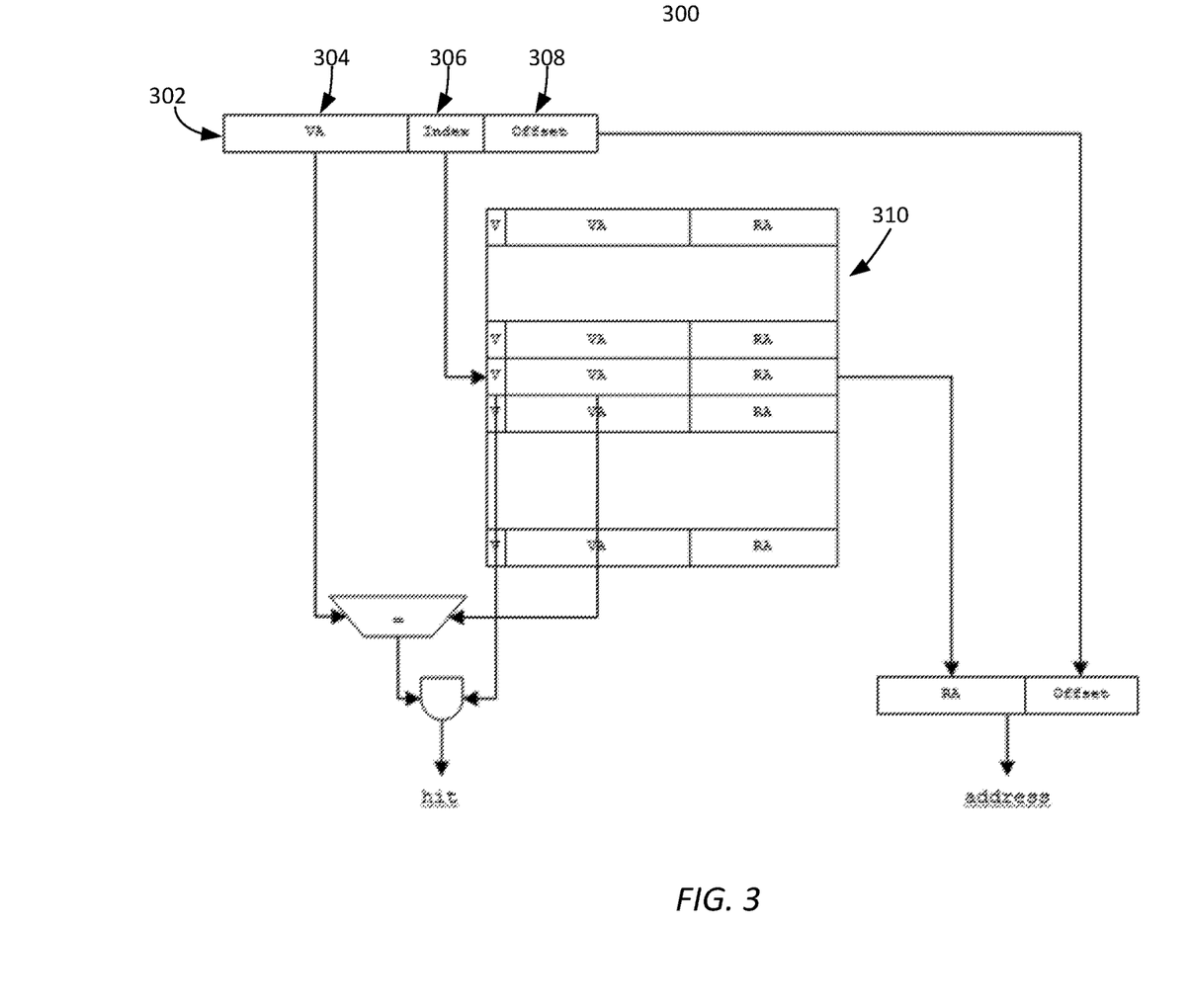
FIG. 3 illustrates using a directly mapped TLB to determine a real address.

In other implementations, a virtual address may contain information that maps the virtual address directly to a TLB entry without the search process used in the fully associative TLB. This type of TLB is referred to as a directly mapped TLB. TLB is organized into TLB pages, and only one TLB entry is examined for each TLB page. To this end, the virtual address used by a process may include a virtual address segment (referred to as tag), an index segment (referred to as index), and an offset segment (referred to as offset). The tag may be used to identify the TLB page associated with the virtual address, and the index may be used to determine the TLB entry within the TLB page. If the virtual address is not in the TLB page, it is a TLB miss. FIG. 3 illustrates using a directly mapped TLB 300 to determine a real address. As shown in FIG. 3, a virtual page 302 may include a tag 304, an index 306, and an offset 308. Tag 304 in virtual page 302 may be used to determine whether the current TLB array 310 is associated with the virtual page 302; if virtual page 302 is associated with TLB array 310, index 306 may be used to determine the TLB entry within TLB array 310. The TLB entry may store a virtual page to physical page mapping. The physical address may be determined by concatenating (or adding) the physical page with the offset 308. Table 2 is a segment of pseudo-code for determining the physical address using a directly mapped TLB.

TABLE 2

```
virtual_page := virtual_address(address'HIGH DOWNTO PageSize );
offset := address(PageSize-1 DOWNTO 0);
TLB_index := TO_INTEGER( UNSIGNED( virtual_page(5 DOWNTO 0) ) );
IF TLB_entries(TLB_index).valid = "1"
        AND TLB_entries(TLB_index).virtual = virtual_page
THEN
    real_page = TLB_entries(TLB_index).real
    hit := TRUE;
ELSE
    hit := FALSE;
END IF;
real_address := real_page & offset;
```

Directly mapped TLBs suffer from TLB entry collisions. For example, it is prohibited to map two virtual pages 302 that use a common TLB entry. For example, if TLB array 310 include 64 entries indexed from 0 to 63, virtual page 0 and virtual page 64 would be associated with the same TLB entry indexed at 0. If a process uses virtual pages in a sequence of 0, 64, 0, 64 and so on, the TLB array may be loaded and evicted frequently and the TLB misses occur frequently. This may degrade the TLB performance. In some implementations, the directly mapped TLB may include multiple (e.g., N=2, 4, 8) TLB arrays referred to as N-way associative TLB, where each TLB array is referred to as a "way." This may be expressed by arranging the entries as a two dimensional array with N columns. The N-way of TLB arrays increase the chance for TLB hits and reduce the rate of TLB misses. Table 3 is a segment of pseudo-code for determining the physical address using an N-way associative TLB.

TABLE 3

```
virtual_page := virtual_address(address'HIGH DOWNTO PageSize );
offset := address(PageSize-1 DOWNTO 0);
TLB_index := TO_INTEGER( UNSIGNED( virtual_page(5 DOWNTO 0) ) );
hit := FALSE;
FOR col IN 0 TO N-1 LOOP
    IF TLB_entries(col, TLB_index).valid = "1"
            AND TLB_entries(col, TLB_index).virtual =
                virtual_page
                AND TLB_entries(col, TLB_index).process_id =
                    currrent_id
    THEN
        real_page = TLB_entries(col,TLB_index).real
        hit := TRUE;
        EXIT;
    END IF;
END LOOP;
real_address := real_page & offset;
```

With page-based address translation, memory is allocated in multiples of the page size (e.g., 4 KB). When the memory needed is smaller than the page size, this can lead to waste of memory space usage. For example, if the page size is 4 KB, but only 1 KB of memory is needed, the allocation of a page (4 KB) of memory may cause 3 KB of memory not being used (or wasted). The larger the page size, the more potential for memory space waste. Larger page size, however, may require fewer TLB entries to map a same amount of real memory, thus reducing the number of TLB misses and improving the speed of the TLB mapping. Thus, there is a tradeoff between the page size and the performance. In some implementations, a TLB table may include pages of different page sizes (e.g., a large page size and a small page size).

One way to implement TLB to support different page sizes in the directly mapped TLB or N-way associative TLB is to index the TLB entries according to the page size. This approach, however, needs to index entries for different page sizes at different locations in the TLB, which is not desirable. An alternative implementation of TLB may include using a flag in TLB entries to indicate the page size (e.g., page size flag="1," indicating a large page size; page size flag="0," indicating a small page size). The tag 304 as shown in FIG. 3 may include enough bits to store the largest page size. The small page size may be stored in the lower bits of tag 304. Assuming the TLB supports two page sizes (e.g., large and small), Table 4 is a segment of pseudo-code for determining the physical address using an N-way associative TLB.

TABLE 4

```
virtual_large := virtual_address(address'HIGH DOWNTO LargePageSize
);
virtual_small := virtual_address(address'HIGH DOWNTO
SmallPageSize );
TLB_index := TO_INTEGER( UNSIGNED( virtual_large(5 DOWNTO
0) ) );
hit := FALSE;
FOR col IN 0 TO N-1 LOOP
    IF TLB_entries(col, TLB_index).valid = "1"
        AND TLB_entries(col, TLB_index).process_id = current_id
    THEN -
        TLB_virtual := TLB_entries(col, TLB_index).virtual;
        TLB_real := TLB_entries(col, TLB_index).real;
        IF TLB_entries(col, TLB_index).is_large_page THEN
            IF TLB_virtual(TLB_virtual'HIGH DOWNTO
            LargePageSize)
                    = virtual_large
            THEN
                hit := TRUE;
                real_address := TLB_real(TLB_real'HIGH
                DOWNTO LargePageSize)
                    & address(LargePageSize-1 DOWNTO 0);
                EXIT;
            END IF
        ELSE - small pages
            IF TLB_virtual = virtual_small THEN
                hit := TRUE;
                real_address := TLB_real & address(SmallPageSize-1
                DOWNTO 0);
                EXIT;
            END IF;
        END IF;
    END IF;
END LOOP;
```

This solution, however, may cause multiple adjacent small pages being mapped to a same index—which may cause additional collisions, thereby increasing the number of TLB misses and degrading the performance.

Another solution is to provide different indices for different page sizes, which may cause a same way to be read from different rows. If a way (or column) of a TLB is implemented using a memory array, the memory array may need to support the readout of multiple rows in one clock cycle. This requires that the array be a multi-ported array. Multi-ported arrays can be both bigger and slower than single-ported arrays, thereby causing lower performance.

In one embodiment, the N-way TLB may be implemented with a number (N) of ways greater than or equal to the number (M) of page sizes. For example, if the TLB supports M (e.g., 4) page sizes, the N-way TLB may include N≥M (e.g., 4) ways. Then, each way may be associated with a particular page size. This can be a fixed mapping, or can be changeable dynamically. Table 5 is a segment of pseudocode for determining the physical address using an N-way associative TLB. In the example of Table 5, there are two page sizes ("LargePageSize" and "SmallPageSize"), and some ways use one (LargePageSize) and some uses the other (SmallPageSize). The code include a control function (TO_INTEGER( )) that may convert a page size to an index value.

TABLE 5

```
virtual_large := virtual_address(address'HIGH DOWNTO LargePageSize
);
virtual_small := virtual_address(address'HIGH DOWNTO
SmallPageSize );
hit := FALSE;
FOR col IN 0 TO N-1 LOOP
    IF TLB_way_is_large(col) THEN
        TLB_index := TO_INTEGER( UNSIGNED( virtual_large(5
```

TABLE 5-continued

```
        DOWNTO 0) ) );
//*convert a page size to an index*/
    TLB_virtual := TLB_entries(col, TLB_index).virtual
    TLB_real := TLB_entries(col, TLB_index).real;
    IF TLB_entries(col, TLB_index).valid = "1"
        AND TLB_entries(col, TLB_index).process_id =
        current_id
        AND TLB_virtual(TLB_virtual'HIGH DOWNTO
        LargePageSize)
            = virtual_large
    THEN
        hit := TRUE;
        real_address := TLB_real(TLB_real'HIGH
        DOWNTO LargePageSize)
            & address(LargePageSize-1 DOWNTO 0);
        EXIT;
    END IF;
    END IF;
ELSE - small pages
    TLB_index := TO_INTEGER( UNSIGNED( virtual_small(5
    DOWNTO 0) ) );
    TLB_virtual := TLB_entries(col, TLB_index).virtual
    TLB_real := TLB_entries(col, TLB_index).real;
    IF TLB_entries(col, TLB_index).valid = "1"
        AND TLB_entries(col, TLB_index).process_id =
        current_id
        AND TLB_virtual = virtual_small
    THEN
        hit := TRUE;
        real_address := TLB_real & address(SmallPageSize-1
        DOWNTO 0);
        EXIT;
    END IF;
    END IF;
END LOOP;
```

In one embodiment, the page size for a way may be pre-determined. In another embodiment, the page size for a way may be set by the processing core executing an instruction. For example, the processing core may specify the page size associated with a way by writing the page size to a control register associated with the processing core. Alternatively, the processing core could select between a fixed set of page sizes for that way by writing to a control register.

Certain virtual to physical address mappings are common for all processes. These common mappings may include those associated with common libraries and system related mappings used by all processes. If each process is identified by a process identifier, multiple TLB entries associated with these common mappings may be needed to store these same mappings associated with different processes. This may create duplicated TLB entries (i.e., those processes using the same mappings). To reduce the duplicated TLB entries, embodiments of the present disclosure provide for a flag in the TLB entry to indicate whether the TLB entry is applicable for all processes.

Figure 4:
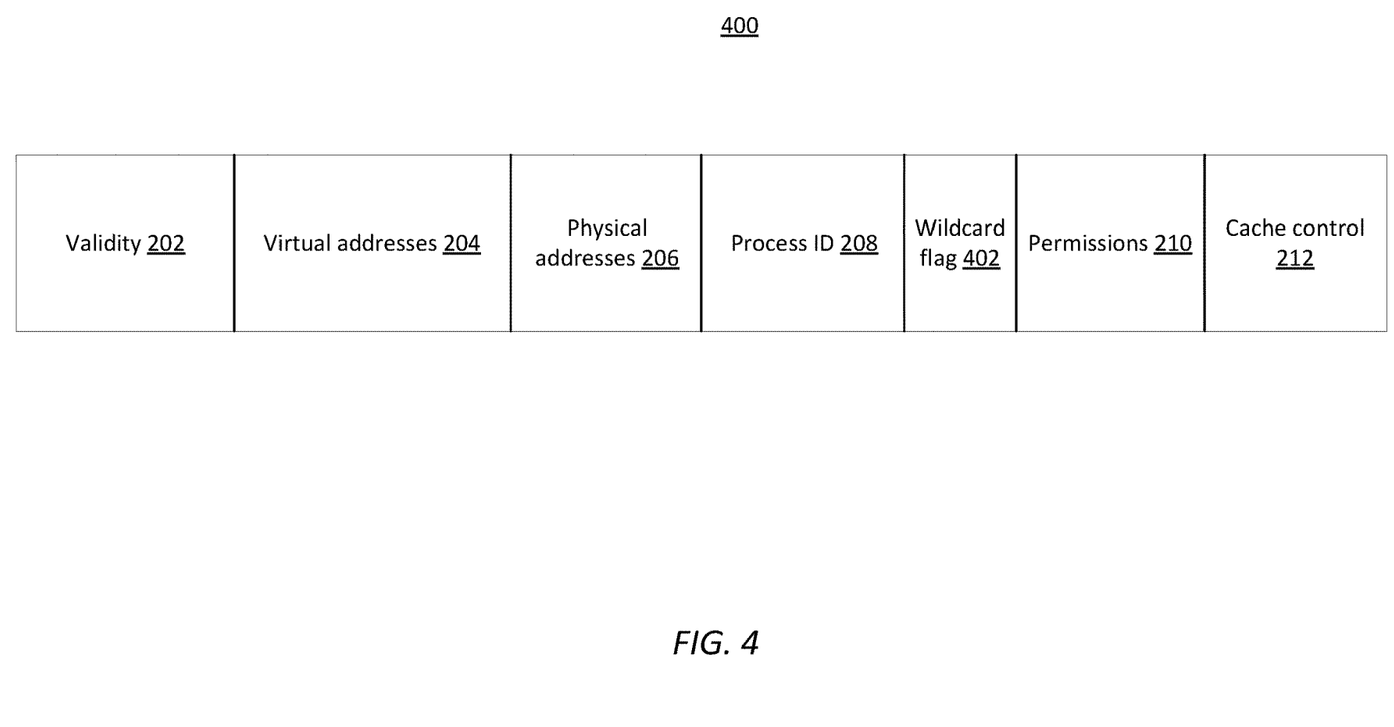
FIG. 4 illustrates a TLB entry including a flag indicating whether the TLB entry is common to all processes according to an embodiment of the present disclosure.

FIG. 4 illustrates a TLB entry 400 including a flag 402 indicating whether the TLB entry is common to all processes according to an embodiment of the present disclosure. TLB entry 400 as shown in FIG. 4 includes all the fields of the TLB entry 200 as shown in FIG. 2. TLB entry 400 may further include a wildcard flag 402 indicating whether TLB entry 400 is associated with all processes. For example, wildcard flag 402 may indicate the association with all processes if the value of wildcard flag 402 is set to one ("1") and not being associated with all processes if the value of wildcard flag 402 is set zero ("0"). In an alternate embodiment, instead of having an explicit wildcard flag, one or more designated process identifiers may be treated as wildcards.

In some implementations, TLB entries may include both entries associated with a wildcard flag and entries that are not associated with a wildcard flag. For such situations, the processing core may make a decision based on a rule. The rule may specify that if there are two matches for a virtual address mapping, one as a wildcard and one where the process identifier matches exactly, the processing core chooses the one whose process identifier matches exactly. This override of the wildcard flag may allow the process to be associated with different page properties (e.g., different permissions). For example, a kernel page may be marked as read only for all non-kernel processes using a wildcard entry, but it may include a wildcard override for the kernel process to allow read and write permissions.

A mapping associated with an operating system may be concentrated on a certain range of virtual addresses. For example, code is typically allocated starting at virtual page 0 or 1. This means that certain virtual page numbers may appear in more processes than others (e.g., virtual page 0 or 1). The frequent usage of certain virtual page numbers causes TLB entries associated with these virtual page numbers more likely to be used across multiple processes, thereby increasing the collision rates for those TLB entries.

Embodiments of the present disclosure provide for an indexing scheme that distributes processes more uniformly in rows of a TLB table. In one embodiment, each process is associated with a different indexing scheme to enable that the same-numbered virtual pages of two different processes are placed in two different-numbered rows. For example, the TLB index may be combined with a unique value for each process. An effective way to achieve the combination to use XOR operation to combine the TLB index with the unique value. In another embodiment, the value associated with a process is not unique with respect to all processes. Even if the value is not unique, the XOR of the value and the TLB index may still generate a distribution of the virtual page indexing in different rows in the TLB.

If the TLB entries are already associated with a unique process identifier and the length (i.e., number of bits) of the process identifier is greater than or equal to the length of the TLB index, the process identifier may serve as the unique value that is combined with the TLB index (e.g., using the XOR operator). Table 6 is a segment of pseudo-code for scrambling the TLB index using the process identifier for an N-way associative TLB.

TABLE 6

```
virtual_page := virtual_address(address'HIGH DOWNTO PageSize );
offset := address(PageSize-1 DOWNTO 0);
TLB_index := TO_INTEGER( UNSIGNED(
                virtual_page(5 DOWNTO 0) ) xor current_id(5
                DOWNTO 0) );
hit := FALSE;
FOR col IN 0 TO N-1 LOOP
    IF TLB_entries(col, TLB_index).valid = "1"
            AND TLB_entries(col, TLB_index).virtual =
            virtual_page
            AND TLB_entries(col, TLB_index).process_id =
            currrent_id
    THEN
        real_page = TLB_entries(col,TLB_index).real
        hit := TRUE;
        EXIT;
    END IF;
END LOOP;
real_address := real_page & offset;
```

This code in Table 6 is directed to a single page size. The scramble of index values may also be applied to multiple page sizes. The code in Table 6 is directed to a single way (i.e. direct mapped) TLB. The scramble of multiple values may also be applied to TLBs with multiple ways. In one embodiment, a TLB may include multiple ways. The processing core may specify whether a way uses index scrambling or not through a control register. In one embodiment, the control register may specify which ways are scrambled and which ways are not scrambled. In one embodiment, the ways that are specified as scrambled may not store TLB entries associated with a wildcard flag enabled.

In one embodiment, it is possible to have both multiple page sizes as well as scrambling. Different ways can be associated with different page sizes. Further, each way may be addressed with or without index scrambling. These behaviors may be fixed, or may be dynamically determined, such as by setting values in a control register.

Figure 5:
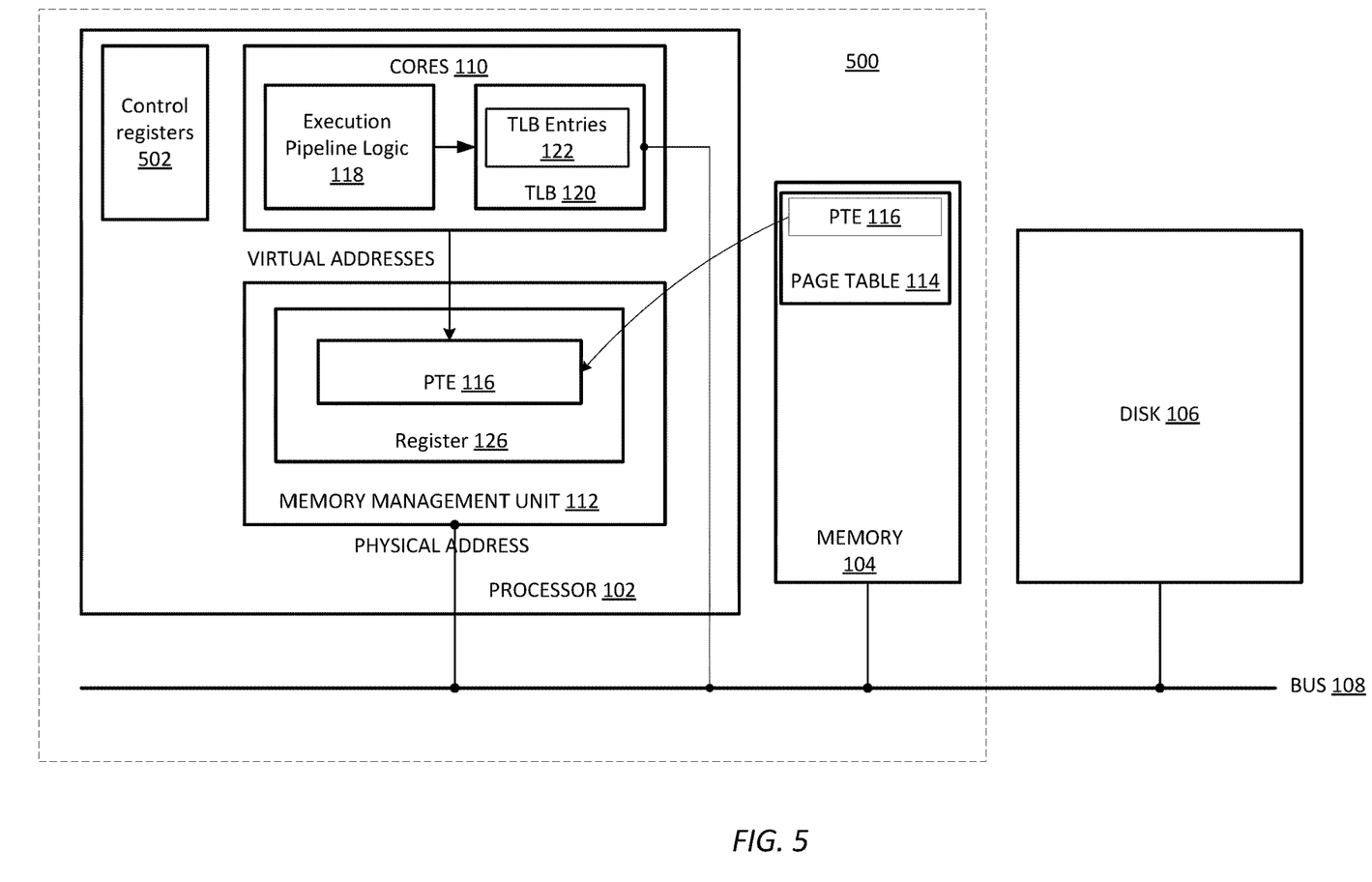
FIG. 5 illustrates a computing system including control registers 502 for setting different TLB schemes according an embodiment of the present disclosure.

FIG. 5 illustrates a computing system 500 including control registers 502 for setting different TLB schemes according an embodiment of the present disclosure. Computing system 500 as shown in FIG. 5 includes hardware elements similar to those of system 100 shown in FIG. 1. System 500 further includes a stack of control registers (e.g. the general purpose registers (GPRs)) associated with processing core 110. Processing core 110 may set parameters in TLB entries 122 via control registers. In one example, a set of control registers 502 may be associated correspondingly with a set of ways, and processing core 110 may use the set of control registers 502 to set the page size associated with each way. In another example, processing core may use the set of control registers 502 to set whether the index in the TLB entries of each way is scrambled or not.

Figure 6:
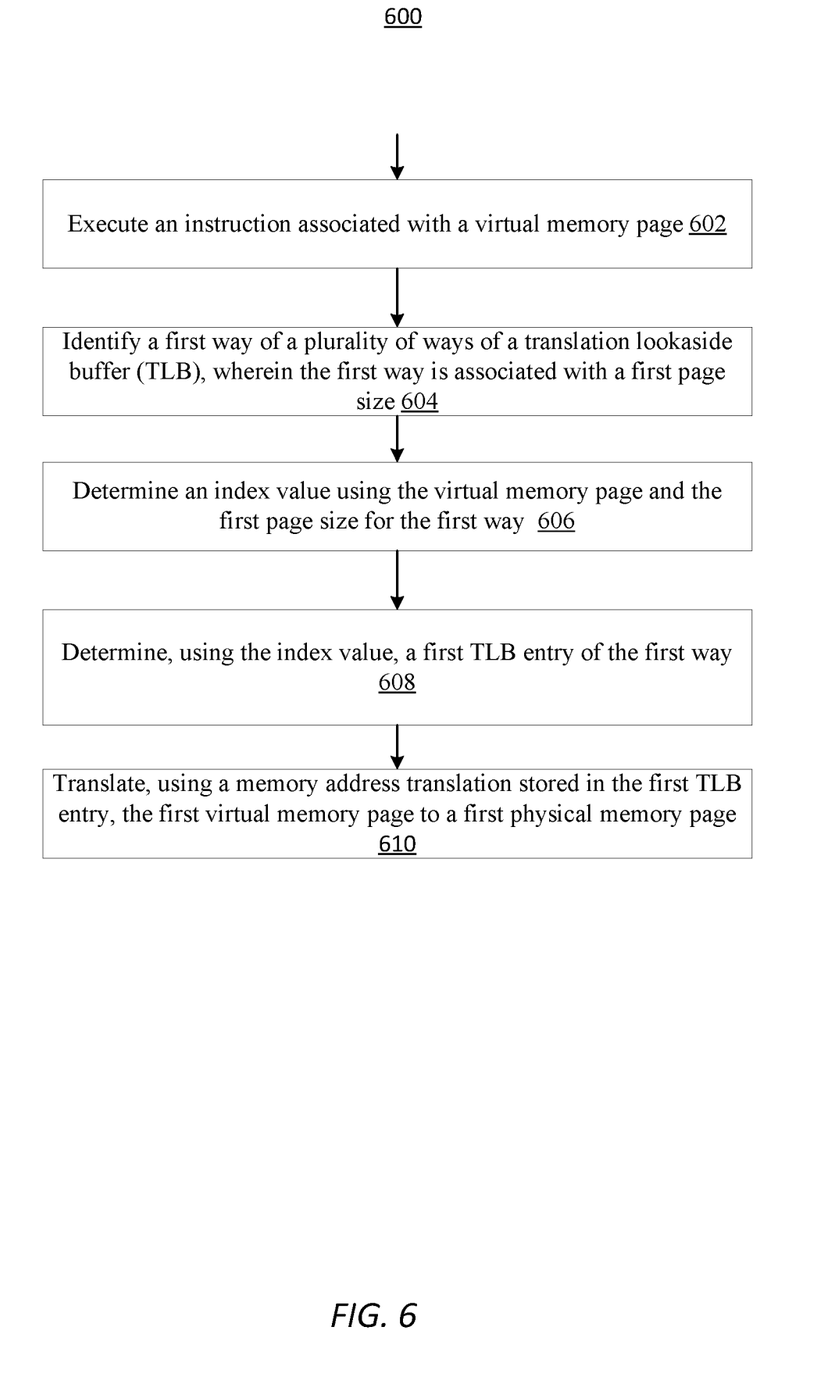
FIG. 6 is a block diagram illustrating a method for using a control to associate a way with a page size according to an embodiment of the present disclosure.

FIG. 6 is a block diagram illustrating a method for using a control to associate a way with a page size according to an embodiment of the present disclosure. Referring to FIG. 6, at 602, processing core 110 may execute an instruction associated with a virtual memory page.

At 604, processing core 110 may identify a first way of a plurality of ways of a translation lookaside buffer (TLB), wherein the first way is associated with a first page size.

At 606, processing core 110 may determine an index value using the virtual memory page and the first page size for the first way.

At 608, processing core 110 may determine, using the index value, a first TLB entry of the first way.

At 610, processing core 110 may translate, using a memory address translation stored in the first TLB entry, the first virtual memory page to a first physical memory page. Further, processing core 110 may execute a second instruction to access the first physical memory page of a memory device.

Example 1 of the present disclosure is a method including executing a process associated with a virtual memory page comprising at least one of a page size indicator or an index value, determining a first page size based on the at least one of the page size indicator or the index value, determining, based on the first page size, a first way of a translation lookaside buffer (TLB), the TLB comprising a plurality of ways, determining, based on the virtual memory page from the first way, a first TLB entry comprising a mapping between the virtual memory page and a physical memory page, and accessing, based on the physical memory page, a memory associated with the processor.

Example 2 of the present disclosure is a processing system including a translation lookaside buffer (TLB) comprising a plurality of ways, wherein each way is associated with a page size, a processing core, communicatively coupled to the TLB, to execute a process associated with a virtual memory page comprising at least one of a page size indicator or an index value, determine a first page size based on the at least one of the page size indicator or the index value, determine, based on the first page size, a first way of the TLB, determine, based on the virtual memory page from the first way, a first TLB entry comprising a mapping between the virtual memory page and a physical memory page, and access, based on the physical memory page, a memory associated with the processor.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplary language does not necessarily refer to the same embodiment or the same example, but may refer to different and distinct embodiments, as well as potentially the same embodiment.

What is claimed is:

1. A processor comprising:
a translation lookaside buffer (TLB) comprising a plurality of ways, wherein each way is associated with a respective page size; and
a processing core, communicatively coupled to the TLB, to:
execute an operating system supporting a plurality of processes, each of the plurality of processes being identified by a respective process identifier;
execute an instruction associated with a first process of the plurality of processes invoking a virtual memory page;
identify a first way of the plurality of ways, the first way comprising a first TLB entry associated with a first process identifier identifying the first process, and the first way further comprising a second TLB entry containing a wildcard flag that, when the wildcard flag is set to a first value, indicates that the first TLB entry is common to all of the plurality of processes, and, when the wildcard flag is set to a second value, indicates that the first TLB entry is associated with fewer than all of the plurality of processes;
responsive to determining that both the first TLB entry and the second TLB entry contain memory address mappings for the virtual memory page, select, based on a rule, the first TLB entry of the first way; and
translate, using a memory address translation stored in the first TLB entry, the first virtual memory page to a first physical memory page.

2. The processor of claim 1, wherein a different way is associated with a different page size.

3. The processor of claim 1, wherein the page size for each one of the plurality of ways is a pre-determined value.

4. The processor of claim 1, wherein the processing core is to execute a page size assignment instruction to assign the first page size to the first way.

5. The processor of claim 1, wherein the index value determines a position of the TLB entry in the TLB, and wherein different index values correspond to different TLB entries in different ways.

6. The processor of claim 1, wherein each way is associated with a respective different page size.

7. The processor of claim 1, wherein the instruction is associated with the first process identified by the first process identifier, and wherein to translate the first virtual memory address, the processing core is to translate based on at least one of a virtual address of the first virtual memory page or the first process identifier.

8. A method comprising:
executing an operating system supporting a plurality of processes, each of the plurality of processes being identified by a respective process identifier;
executing an instruction associated with a first process of the plurality of processes invoking a virtual memory page;
identifying a first way of a plurality of ways of a translation lookaside buffer (TLB), the first way comprising a first TLB entry associated with a first process identifier identifying the first process, and the first way further comprising a second TLB entry containing a wildcard flag that, when the wildcard flag is set to a first value, indicates that the first TLB entry is common to all of the plurality of processes, and, when the wildcard flag is set to a second value, indicates that the first TLB entry is associated with fewer than all of the plurality of processes;
responsive to determining that both the first entry and the second TLB entry contain memory address mappings for the virtual memory page, selecting, based on a rule, the first TLB entry of the first way; and
translating, using a memory address translation stored in the first TLB entry, the first virtual memory page to a first physical memory page.

9. The method of claim 8, wherein a different way is associated with a different page size.

10. The method of claim 8, wherein the page size for each one of the plurality of ways is a pre-determined value.

11. The method of claim 8, further comprising: executing a page size assignment instruction to assign the first page size to the first way.

12. A processor, comprising:
a translation lookaside buffer (TLB) comprising a plurality of ways;
a control register to store way identifiers for ways to be scrambled; and a processing core, communicatively coupled to the TLB and the control register, to:
  execute an operating system supporting a plurality of processes, each of the plurality of processes being identified by a respective process identifier;
  identify a first way of the plurality of ways; and
  responsive to determining, based on the identifiers stored in the control register, that indices associated with a first way are to be scrambled,
    select a plurality of bits from the virtual memory page;
    determine an index value of a first translation-lookaside buffer (TLB) entry by performing an exclusive OR operation between the selected plurality of bits and a unique value that is one of assigned to the first way or assigned by an instruction;
    store the first TLB entry according to the index value in the first way; and
    translate, using a memory address translation stored in the first TLB entry, the first virtual memory page to a first physical memory page;
  responsive to determining, based on the identifiers stored in the control register, that indices associated with a second way are not to be scrambled,
  determine a second index for a second TLB entry; and
    store the second TLB entry according to the second index value in the second way, wherein the second TLB entry contains a wildcard flag that, when the wildcard flag is set to a first value, indicates that second TLB entry is common to all of the plurality of processes, and, when the wildcard flag is set to a second value, indicates that second TLB entry is associated with fewer than all of the plurality of processes.

13. The processor of claim 12, wherein to determine the index value, the processing core is to determine the index value based on selected bits from an address associated with the virtual memory page.

14. The processor of claim 12, wherein each one of the plurality of ways is associated with a respective unique value.

15. The processor of claim 12, where the processing core is to determine the index value using a different method for a different way.

16. The processor of claim 15, wherein a method used to determine the index value is modified by a program.

17. The processor of claim 12, wherein the instruction is associated with a process identified by a process identifier, and wherein to translate the first virtual memory address, the processing core is to translate based on at least one of a virtual address of the first virtual memory page or the process identifier.

18. The processor of claim 17, wherein the process identifier is to provide the unique value.

19. The processor of claim 1, wherein the rule specifies that if there are two matches for a virtual address, one as the wildcard flag and one as an exact match by the first process identifier, the processing core selects the one associated with the first process identifier over the one associated with the wildcard flag.

* * * * *